United States Patent
Sakai

(10) Patent No.: US 9,017,164 B2
(45) Date of Patent: Apr. 28, 2015

(54) GAME DEVICE PROVIDED WITH TOUCH PANEL, GAME CONTROL PROGRAM, AND METHOD FOR CONTROLLING GAME

(75) Inventor: Masaharu Sakai, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 248 days.

(21) Appl. No.: 13/387,832

(22) PCT Filed: Jun. 3, 2010

(86) PCT No.: PCT/JP2010/003725
§ 371 (c)(1),
(2), (4) Date: Apr. 4, 2012

(87) PCT Pub. No.: WO2011/018869
PCT Pub. Date: Feb. 17, 2011

(65) Prior Publication Data
US 2012/0231884 A1    Sep. 13, 2012

(30) Foreign Application Priority Data

Aug. 11, 2009 (JP) .................................. 2009-186695
Aug. 11, 2009 (JP) .................................. 2009-186696

(51) Int. Cl.
*G06F 3/0487* (2013.01)
*G06F 3/0481* (2013.01)
(Continued)

(52) U.S. Cl.
CPC .............. *A63F 13/10* (2013.01); *G06F 3/0481* (2013.01); *G06F 3/0487* (2013.01); *A63F 2300/1075* (2013.01); *A63F 2300/204* (2013.01);
(Continued)

(58) Field of Classification Search
USPC .................. 463/31, 33, 36, 67; 345/173–178, 345/619–689
See application file for complete search history.

(56) References Cited

U.S. PATENT DOCUMENTS 5,729,219 A * 3/1998 Armstrong et al. ............. 341/20
6,681,124 B2 * 1/2004 Prior et al. ..................... 455/563
(Continued)

FOREIGN PATENT DOCUMENTS

JP       2001034383 A    2/2001
JP       2002077357 A    3/2002
(Continued)

OTHER PUBLICATIONS

International Search Report for corresponding PCT Application PCT/JP2010/003725, dated Aug. 10, 2010.
(Continued)

*Primary Examiner* — Bach Hoang
(74) *Attorney, Agent, or Firm* — Matthew B. Dernier, Esq.; Gibson & Dernier LLP

(57) ABSTRACT

A game device includes: a display device; a rear touch panel provided on the other side of a surface on which the display device is mounted; an activation control unit operative, when the rear touch panel detects an operation of bringing an input means into contact with the rear touch panel and moving the input means in a predetermined direction, to activate a function determined in accordance with the direction; and a screen image managing unit operative to display a screen image displayed by the function activated by the activation control unit on the display device so that the screen image slides from an edge of the screen of the display device in the direction.

6 Claims, 19 Drawing Sheets

(51) Int. Cl.
*G06F 3/01* (2006.01)
*A63F 13/40* (2014.01)
*G06F 1/16* (2006.01)
*G06F 3/0488* (2013.01)

(52) U.S. Cl.
CPC ....... *A63F2300/6045* (2013.01); *G06F 1/1626* (2013.01); *G06F 1/1692* (2013.01); *G06F 3/04883* (2013.01)

(56) References Cited

U.S. PATENT DOCUMENTS

| | | | |
|---|---|---|---|
| 6,741,268 | B1 | 5/2004 | Hayakawa |
| 7,088,342 | B2 | 8/2006 | Rekimoto |
| 8,265,717 | B2* | 9/2012 | Gorsica et al. ............. 455/575.3 |
| 8,352,884 | B2* | 1/2013 | Zalewski et al. ............. 715/864 |
| 8,373,660 | B2* | 2/2013 | Pallakoff ....................... 345/163 |
| 8,375,295 | B2* | 2/2013 | Zalewski et al. ............. 715/234 |
| 8,434,003 | B2* | 4/2013 | Zalewski et al. ............. 715/702 |
| 8,462,126 | B2* | 6/2013 | Cholewin et al. ............. 345/173 |
| 8,497,884 | B2* | 7/2013 | Cholewin et al. ............. 345/678 |
| 8,514,171 | B2* | 8/2013 | Jolly .............................. 345/156 |
| 2003/0234768 | A1 | 12/2003 | Rekimoto |
| 2004/0106439 | A1* | 6/2004 | Garroch ........................ 455/566 |
| 2004/0263484 | A1* | 12/2004 | Mantysalo et al. ........... 345/173 |
| 2006/0026521 | A1* | 2/2006 | Hotelling et al. ............. 715/702 |
| 2010/0064212 | A1* | 3/2010 | Snyder .......................... 715/700 |
| 2010/0299596 | A1* | 11/2010 | Zalewski et al. ............. 715/702 |

FOREIGN PATENT DOCUMENTS

| | | |
|---|---|---|
| JP | 2003330611 A | 11/2003 |
| JP | 2007141029 A | 6/2007 |
| WO | WO 2009034242 A1 * | 3/2009 |

OTHER PUBLICATIONS

International Preliminary Report on Patentability and Written Opinion for corresponding PCT Application PCT/JP2010/003725, dated Feb. 14, 2012.

Office Action issued for corresponding Japanese Patent Application No. 2009-186696, dated Feb. 5, 2013.

Office Action issued for corresponding Japanese Patent Application No. 2009-186696, dated Oct. 8, 2013.

* cited by examiner

FIG. 16
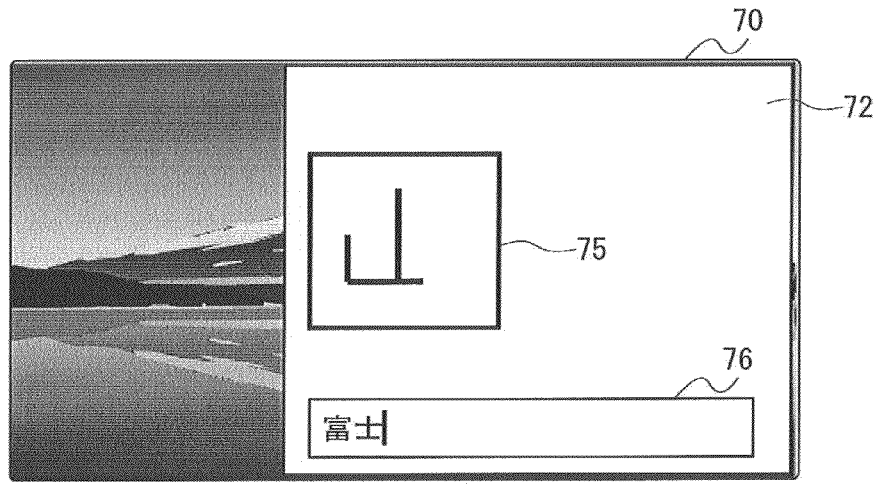
FIG. 17
FIG. 18
| DIRECTION | FUNCTION | CONDITION |
|---|---|---|
| → | MUTE | — |
| ← | DISPLAYING INFORMATION | DISPLAYING IS FORBIDDEN WHILE A CAPTION IS DISPLAYED |
| ↓ | CLIP BOARD | — |
| ↑ | DISPLAYING CAPTION | — |
60

FIG. 21

| SCREEN IMAGE ID | POSITION | SIZE | SEQUENCE | DISPLAY MODE | INPUT DEVICE | TOUCH PANEL | REAR TOUCH PANEL |
|---|---|---|---|---|---|---|---|
| 00 | (0, 0) | (480, 272) | 2 | 0 | 0 | 1 | 0 |
| 01 | (160, 0) | (320, 272) | 1 | 0 | 1 | 0 | 0 |
| 02 | (0, 272) | (480, 60) | — | 1 | 0 | 0 | 0 |
| .. | .. | .. | .. | .. | .. | .. | .. |

GAME DEVICE PROVIDED WITH TOUCH PANEL, GAME CONTROL PROGRAM, AND METHOD FOR CONTROLLING GAME

TECHNICAL FIELD

The present invention generally relates to game control technology, and more particularly, to a game device provided with a touch panel, a game control program, and a method for controlling a game.

BACKGROUND ART

Portable type game devices provided with a touch panel have become popular. Since such devices can receive not only operations input through a button or a direction key, but also operations input through a touch panel. Therefore, the variety of user interfaces is broadened, and development of a game provided with a novel system for operation is expected.

SUMMARY OF THE INVENTION

The present inventor has attained an idea on a technology for improving user friendliness by using a game device that is configured to provide a touch panel on the other side of the surface on which a display device is mounted and further configured to receive a wide variety of operations.

The present invention addresses the aforementioned issue, and a purpose thereof is to provide a technology for improving user friendliness.

According to an embodiment of the present invention, a game device is provided. The game device includes: a display device; a rear touch panel provided on the other side of a surface on which the display device is mounted; an activation control unit operative, when the rear touch panel detects an operation of bringing an input means into contact with the rear touch panel and moving the input means in a predetermined direction, to activate a function determined in accordance with the predetermined direction; and a screen image managing unit operative to display a screen image displayed by the function activated by the activation control unit on the display device so that the screen image slides from a edge of the screen of the display device in the predetermined direction.

According to another embodiment of the present invention, a game device is provided. The game device includes: a display device; a rear touch panel provided on the other side of a surface on which the display device is mounted; an application operative to provide a predetermined function; a function control unit operative to control a function that is activated when the rear touch panel is operated; an input device operative to allow a user to input an instruction to the application or the function control unit; and an event control unit operative, when a basic screen image displayed by the application and a virtual screen image displayed by the function control unit are displayed on the display device, to determine to which of the application or the function control unit to notify of an operation input via the input device, and operative to notify a determined target of the operation input via the input device.

Optional combinations of the aforementioned constituting elements, and implementations of the invention in the form of methods, apparatuses, systems, or the like may also be practiced as additional modes of the present invention.

According to the present invention, a technology for improving user friendliness can be provided.

BRIEF DESCRIPTION OF THE DRAWINGS

FIG. 16 is a diagram that illustrates a text input function;

FIG. 17 is a diagram that illustrates a music playback function;

FIG. 18 shows an example of internal data of an function activation table;

FIG. 21 shows an example of internal data of a screen image managing table.

DETAILED DESCRIPTION OF THE INVENTION

Figure 1:
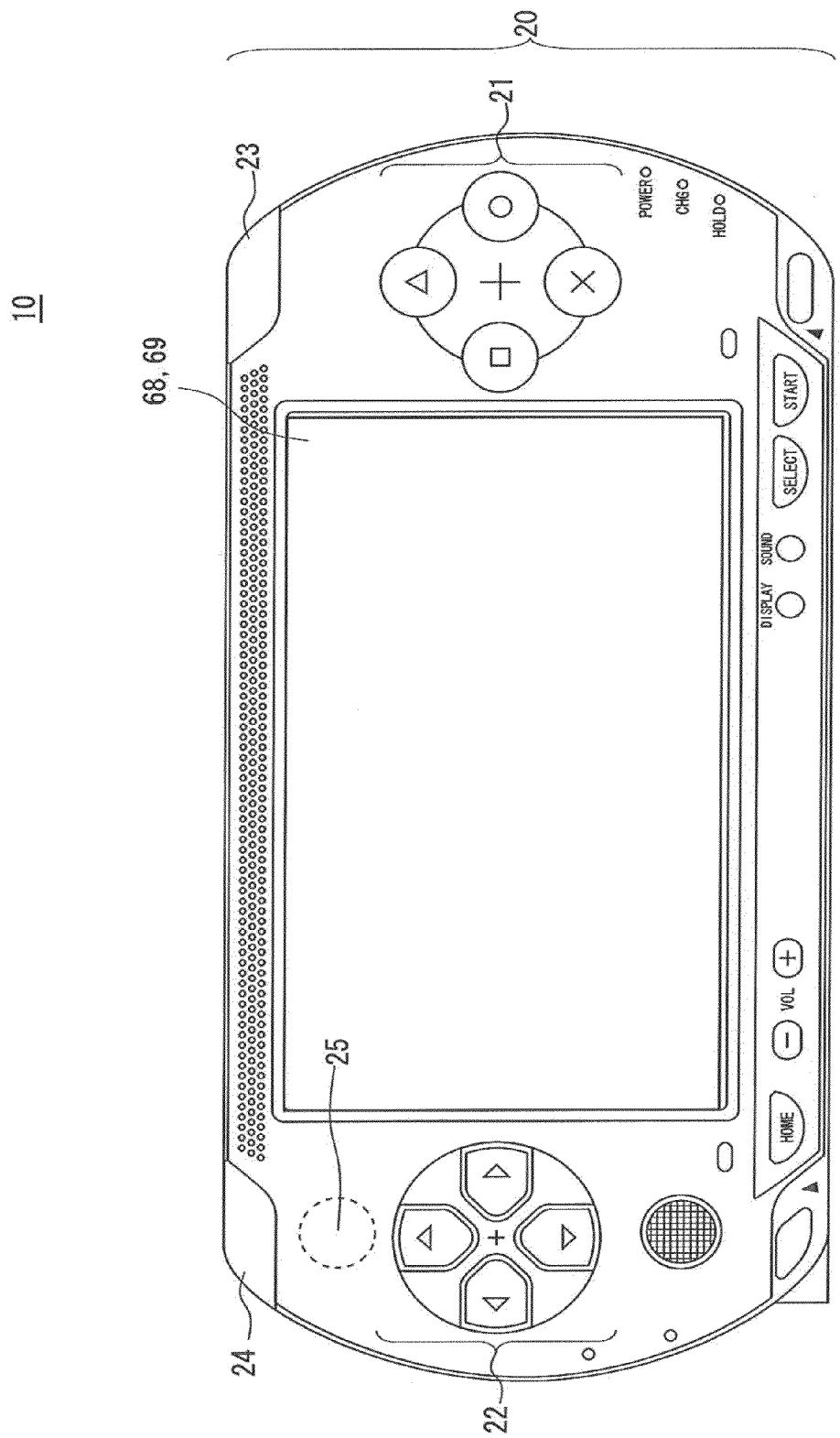
FIG. 1 shows an external view of a game device according to an embodiment.
Figure 2:
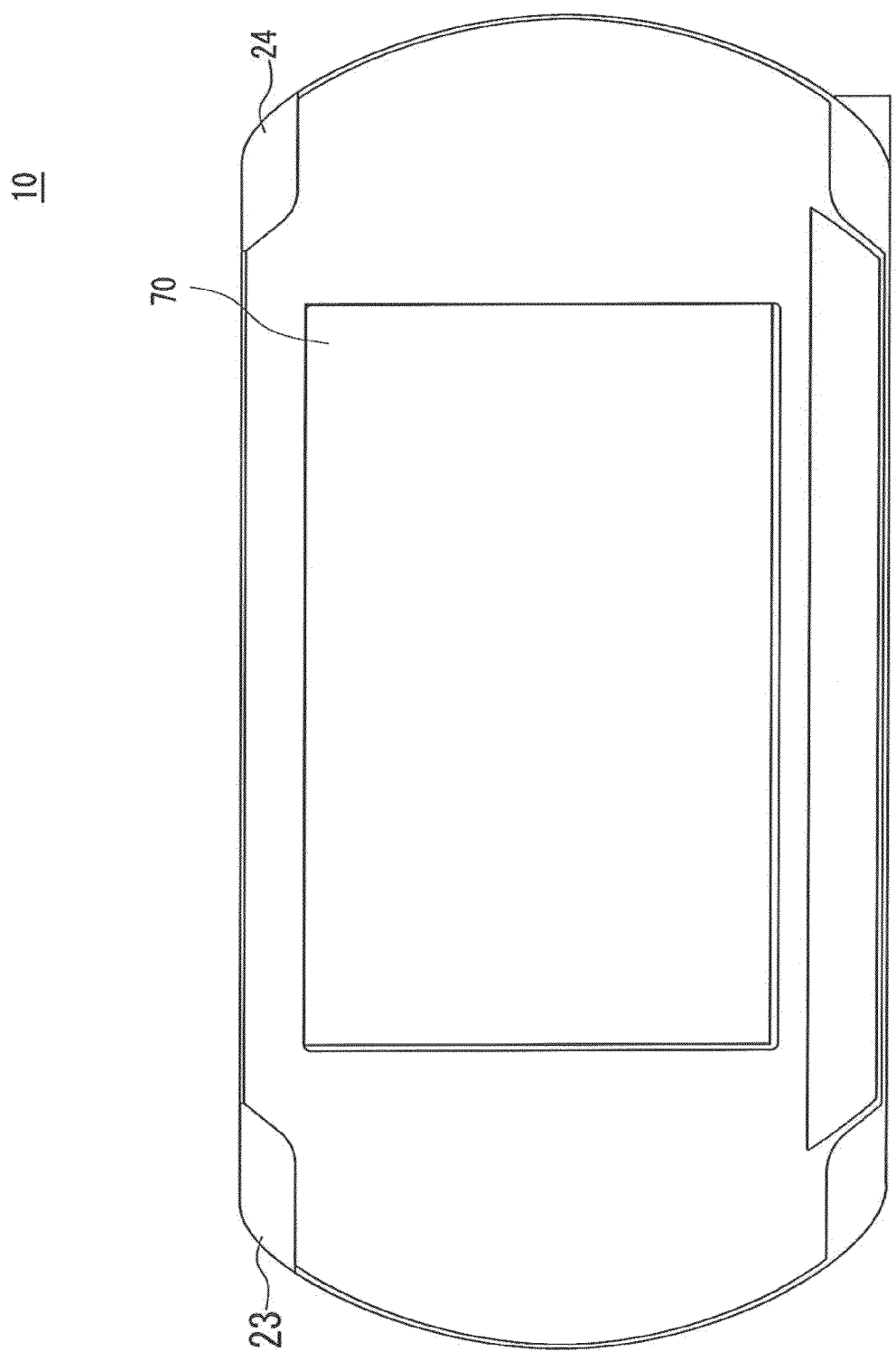
FIG. 2 shows an external view of the game device according to the embodiment.

FIGS. 1 and 2 show external views of a game device 10 according to an embodiment. As shown in FIG. 1, on the front side of the game device 10 (i.e., the side facing to a user when the user holds and manipulates the game device 10), an input device 20, such as, an instruction input button 21, a direction key 22, an R button 23, an L button 24, or the like, and a display device 68 are provided. With the display device 68, a touch panel 69 for detecting a contact made by a finger of the user, a stylus pen, or the like is provided. In the game device 10, an inclination sensor 25 that detects the inclination of the game device 10 is provided.

As shown in FIG. 2, on the backside of the game device 10, a rear touch panel 70 is provided. Another display device may be provided on the backside of the game device 10 in a similar manner with that of the front side. However, according to the embodiment, a display device is not provided on the backside of the game device 10 and only the rear touch panel 70 is provided on the backside.

A user can, for example, manipulate the instruction input button 21 with the right hand thumb, manipulate the direction key 22 with the left hand thumb, manipulate the R button 23 with the right hand index finger or the middle finger, manipulate the L button 24 with the left hand index finger or the middle finger, and manipulate the rear touch panel 70 with the ring fingers or the pinky fingers of his/her both hands while holding the game device 10 with the both hands. In case of using a stylus pen, or the like, for example, a user can manipulate the touch panel 69 with the right hand using the stylus pen, manipulate the direction key 22 with the left hand thumb, manipulate the L button 24 with the left hand index finger or the middle finger, and manipulate the rear touch panel 70 with the left hand ring finger or the pinky finger while holding the game device 10 with the left hand.

An operation on the rear touch panel 70 may be used also by an application, such as a game program or the like executed in the game device 10. Nevertheless, an explanation will be given according to the embodiment on a technology for activating, when a predetermined operation is made on the rear touch panel 70, a function associated with the operation, and displaying a display screen image for providing the function (herein after, also referred to as a "sub screen image") on the display device 68 in addition to a display screen image provided by a running game program (herein after, also referred to as a "basic screen image"). This provides a user interface that can be easily understood and operated intuitively. With the user interface, an independent function can be activated besides a running program in parallel, or a function can be added to the running program.

Figure 3:
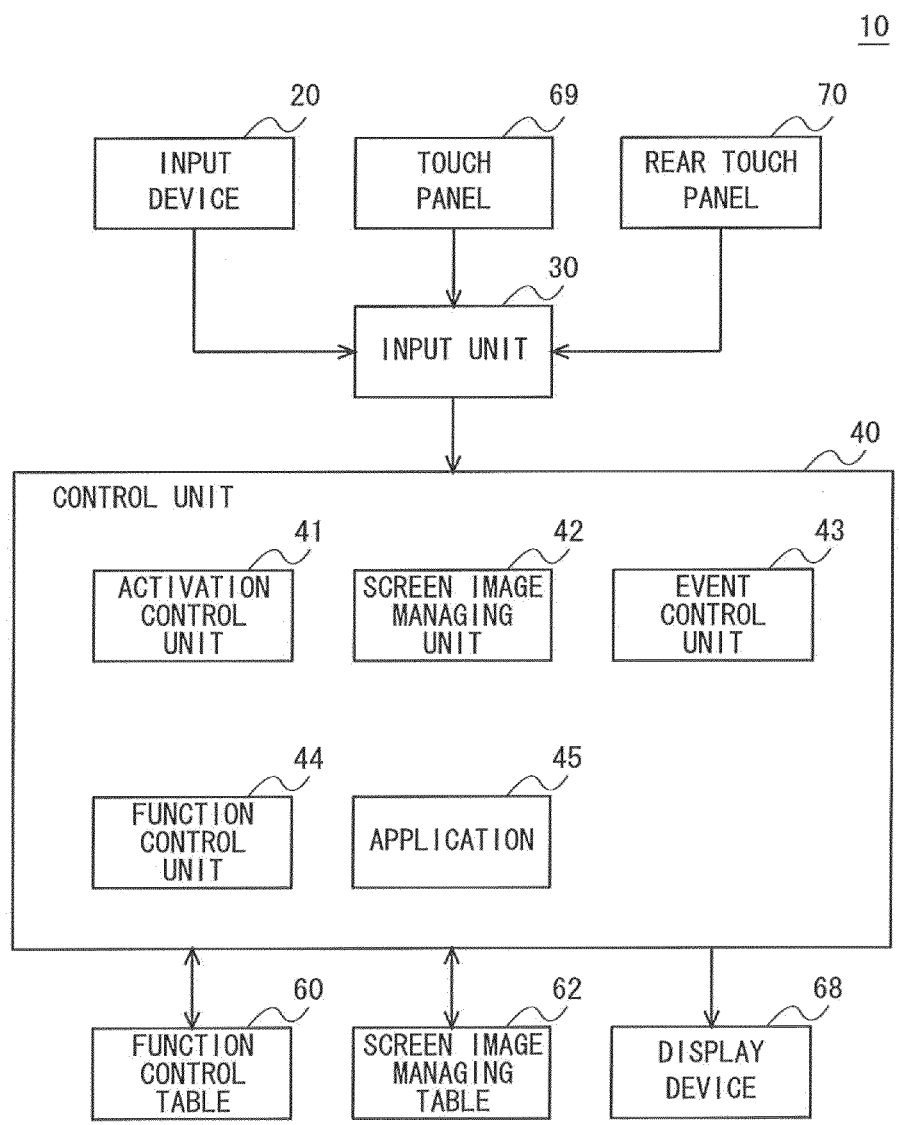
FIG. 3 shows the structure of the game device.

FIG. 3 shows the structure of the game device 10. The game device 10 comprises an input device 20, a touch panel 69, a rear touch panel 70, an input unit 30, a control unit 40, a function control table 60, a screen image managing table 62, and a display device 68. Those elements are implemented by a CPU of a computer, memory, a program loaded into the memory, or the like in terms of hardware components. FIG. 1 depicts functional blocks implemented by cooperation of these components. Therefore, it will be obvious to those skilled in the art that the functional blocks may be implemented in a variety of ways, by hardware only, software only, or a combination thereof.

The input unit 30 receives an operation input by a user via the input device 20, the touch panel 69, and the rear touch panel 70. The control unit 40 executes an application (i.e., a game program or the like), various functions, etc., based on the operation input by the user and received by the input unit 30. The function control table 60 associates the detail of the operation made by the user and the functions that should be activated in accordance therewith each other, and stores accordingly. The screen image managing table 62 stores information for managing the sub screen image. The display device 68 displays a basic screen image and a sub screen image generated by the control unit 40.

The control unit 40 includes, an activation control unit 41, a screen image managing unit 42, an event control unit 43, a function control unit 44, and an application 45. The application 45 provides a predetermined function by using the basic screen image. The function control unit 44 controls a variety of functions provided by using the sub screen image. The activation control unit 41 determines a function to be activated. The screen image managing unit 42 manages the basic screen image provided by the application 45 and the sub screen image provided by the function control unit 44. The event control unit 43 notifies an appropriate target of the operation input via the input device 20, the touch panel 69, and the rear touch panel 70.

Figure 4A:
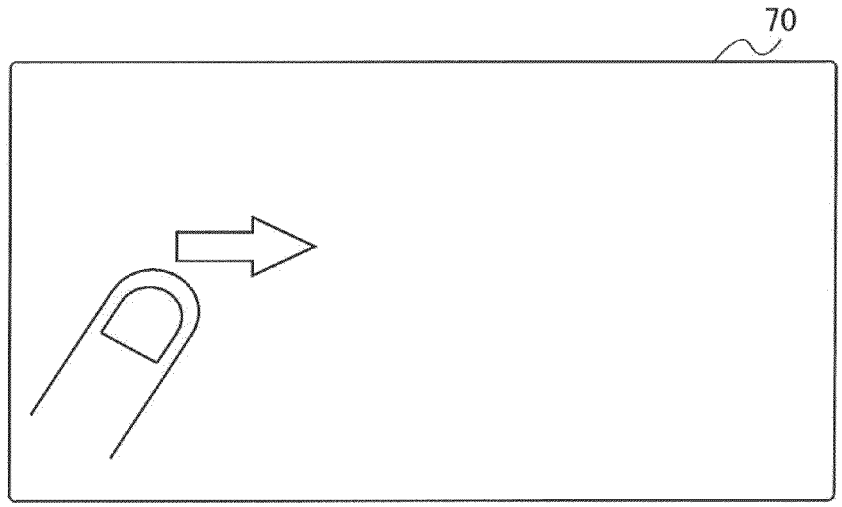
FIGS. 4A, 4B, and 4C are diagrams that illustrate a method for allowing an operation on the rear touch panel to activate a predetermined function.
Figure 4B:
Figure 4C:
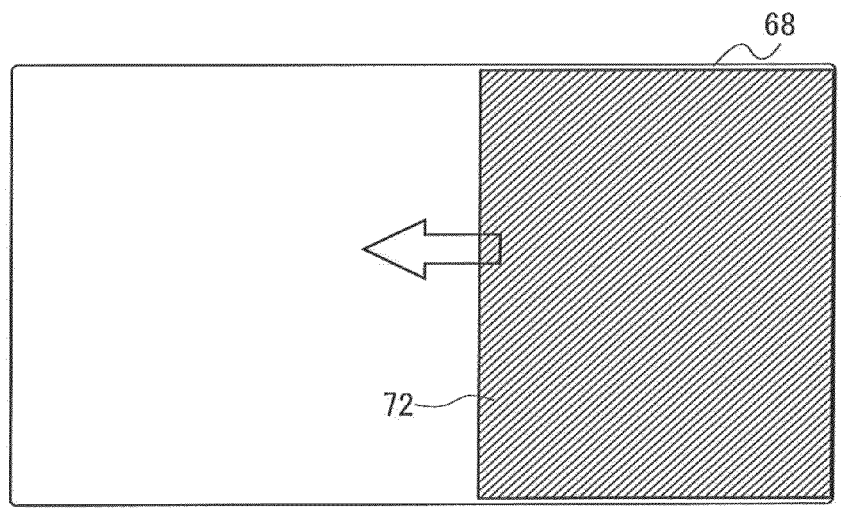

FIGS. 4A, 4B, and 4C are diagrams that illustrate a method for allowing an operation on the rear touch panel to activate a predetermined function. As shown in FIG. 4A, a user slides his/her finger from left to right on the rear touch panel 70 when viewed from the backside of the game device 10, which means that the user slides the finger from right to left when viewed from the user's point of view, as shown in FIG. 4B. In this process, the input unit 30 conveys information that an operation of moving an input position from left to right is made on the rear touch panel 70 to the control unit 40. The event control unit 43 notifies the activation control unit 41 of the conveyed input operation. The activation control unit 41 issues an instruction to direct the function control unit 44 to activate a function corresponding to the operation. The screen image managing unit 42 displays the sub screen image 72 for displaying a display screen image derived from the activated function so that the sub screen image 72 is pulled out from right to left on the display device 68 as shown in FIG. 4C. This allows the sub screen image 72 to be presented as if pulled out by user's finger from right to left. Thus, a user interface that can be easily understood intuitively can be implemented.

Figure 5A:
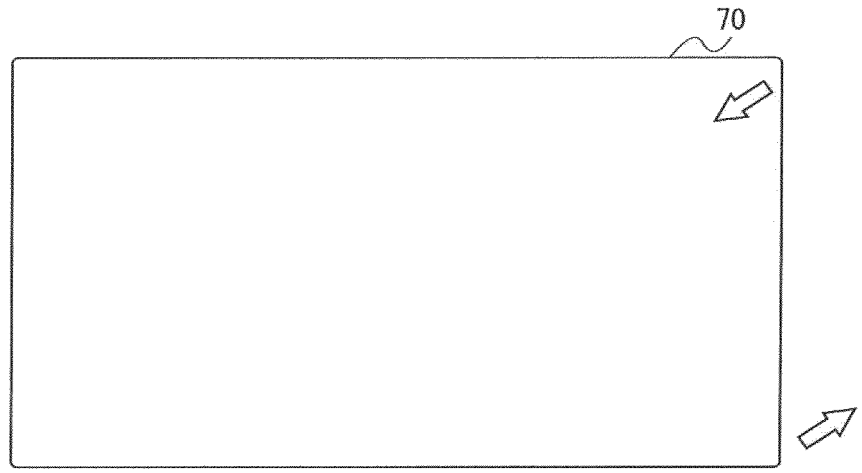
FIGS. 5A, 5B, and 5C are diagrams that illustrate a method for allowing an operation of inclining the game device to activate a predetermined function.
Figure 5B:
Figure 5C:
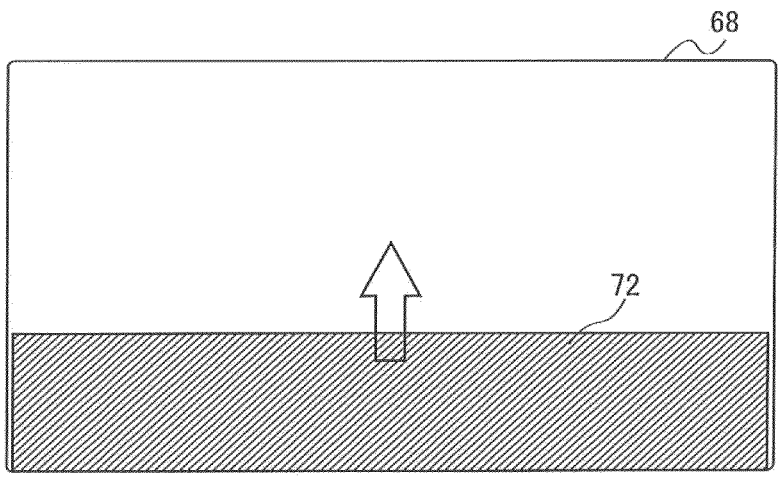

FIGS. 5A, 5B, and 5C are diagrams that illustrate a method for allowing an operation of inclining the game device to activate a predetermined function. Since the game device 10 comprises the inclination sensor 25, the game device 10 can activate a predetermined function in accordance with the inclination of the game device 10. As shown in FIG. 5A, a user gives a tilt to the game device 10 so that the upper part of the device comes forward and the lower side moves backward when viewed from the backside of the game device 10, which means that the upper part of the device moves backward and the lower side comes forward when viewed from the user's point of view, as shown in FIG. 5B. In this process, the input unit 30 conveys information that an operation of tilting the game device 10 in the aforementioned way is made to the control unit 40. The event control unit 43 notifies the activation control unit 41 of the conveyed input operation. The activation control unit 41 issues an instruction to direct the function control unit 44 to activate a function corresponding to the operation. The screen image managing unit 42 displays the sub screen image 72 for displaying a display screen image derived from the activated function so that the sub screen image 72 slides down in the direction from the top to the bottom on the display device 68 as shown in FIG. 5C. This allows the sub screen image 72 to be presented as if user's tilting of the game device 10 causes the sliding down of the sub screen image 72. Thus, a user interface that can be understood intuitively can be implemented.

Figure 6A:
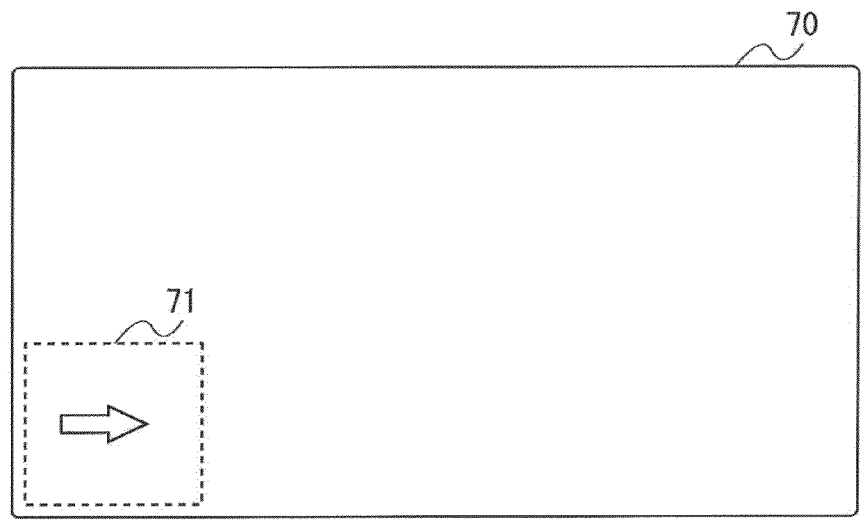
FIGS. 6A, 6B, and 6C are diagrams that illustrate a method for allowing an operation on the rear touch panel to activate a predetermined function.
Figure 6B:
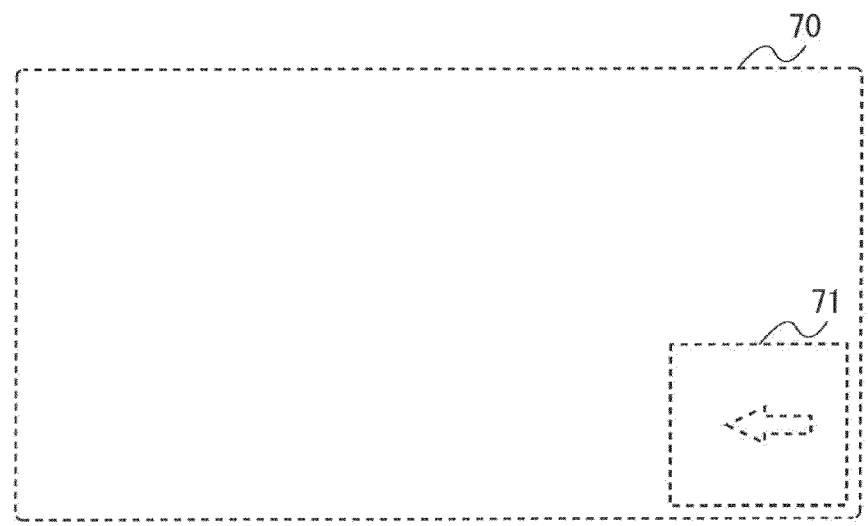
Figure 6C:
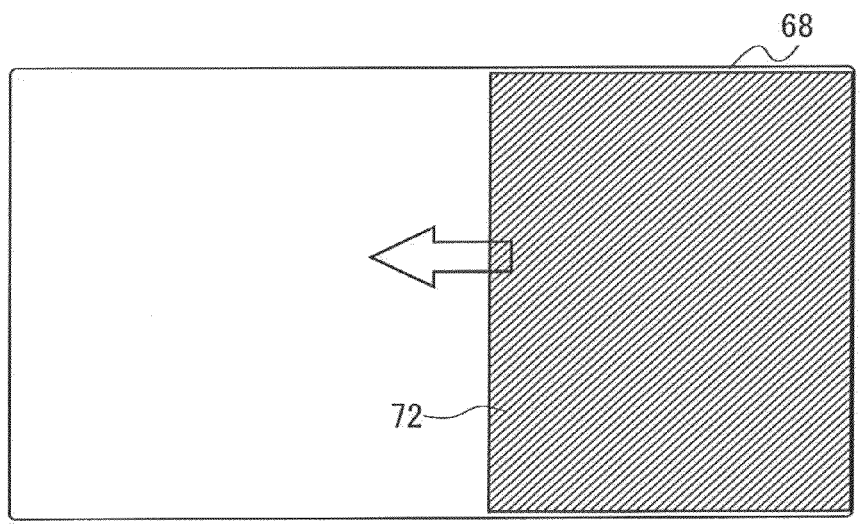

FIGS. 6A, 6B, and 6C are diagrams that illustrate a method for allowing an operation on the rear touch panel to activate a predetermined function. In the method shown in FIGS. 4A, 4B, and 4C, the whole area of the rear touch panel 70 is used as a user interface that receives an operation for activating a predetermined function. However, in this case, the rear touch panel 70 cannot be used as a user interface for a running application. In the method shown in FIGS. 6A, 6B, and 6C, while the rear touch panel 70 is used as a user interface for a running application, a part of the panel is used as a user interface that receives an operation for activating a predetermined function.

As shown in FIG. 6A, the screen image managing unit 42 defines a part of the rear touch panel 70 as a function activation region 71 that receives an operation for activating a predetermined function. When the event control unit 43 receives an operation input onto the rear touch panel 70 via the input unit 30, if the operated position is at the inside of the function activation region 71, the input operation is not notified to the running application but notified to the activation control unit 41. As shown in FIG. 6A, a user slides his/her finger from left to right in the function activation region 71 of the rear touch panel 70 when viewed from the backside of the game device 10, which means that the user slides the finger from right to left when viewed from the user's point of view, as shown in FIG. 6B. In this process, the input unit 30 conveys information that an operation of moving an input position from left to right is made on the rear touch panel 70 to the control unit 40. Since the conveyed operation is input at the position inside the function activation region 71, the event control unit 43 notifies the activation control unit 41 of the input operation. The activation control unit 41 issues an instruction to direct the function control unit 44 to activate a function corresponding to the operation. The screen image managing unit 42 displays the sub screen image 72 for displaying a display screen image derived from the activated function so that the sub screen image 72 is pulled out from right to left on the display device 68 as shown in FIG. 6C. If the operated position is at the outside of the function activation region 71, the event control unit 43 notifies the running application of the input operation.

The screen image managing unit 42 may receive the specification of the position and the size of the function activation region 71 from a user. The screen image managing unit 42 may provide a configuration screen for configuring the function activation region 71 to the user and may receives the specification of the position and the size of the function activation region 71 by a drag operation of the user, or the like.

If a predetermined condition for quitting displaying the sub screen image is met, the activation control unit 41 instructs the function control unit 44 to complete the function that has been activated, and instructs the screen image managing unit 42 to quit the displaying of the sub screen image. The screen image managing unit 42 may first move the sub screen image in the direction from which the sub screen image was pulled out as if the sub screen image is pulled in and delete the sub screen image, accordingly. The activation control unit 41 may instruct the screen image managing unit 42 to quit the displaying of the sub screen image when a function executed by the function control unit 44 is completed for some reason.

Discontinuation of an input onto the rear touch panel 70 may be defined as the condition for quitting displaying the sub screen image. The input unit 30 conveys that a portion for inputting is detached from the rear touch panel 70 to the event control unit 43, and the event control unit 43 notifies the activation control unit 41 thereof, accordingly. The activation control unit 41 determines that the condition for quitting displaying the sub screen image is satisfied, instructs the function control unit 44 to complete the function that has been activated, and instructs the screen image managing unit 42 to quit the displaying of the sub screen image. In this case, after the user pulls out the sub screen image by using the rear touch panel 70, while the user keeps contact with the rear touch panel 70, the sub screen image is displayed, and if the user lets off his/her finger from the rear touch panel 70, the sub screen image is drawn back. The activation control unit 41 may quit the displaying of the sub screen image when an input onto either the rear touch panel 70 or a region in the touch panel 69 where the sub screen image is displayed does not exist anymore. Alternatively, the activation control unit 41 may quit the displaying of the sub screen image when inputs onto both of them do not exist anymore.

The performance of an operation for quitting displaying of the sub screen image may be defined as the condition for quitting displaying the sub screen image. For example, an operation of tapping the rear touch panel 70 may be allocated to the operation for quitting displaying the sub screen image. The input unit 30 conveys that the operation of tapping the rear touch panel 70 is made to the event control unit 43, and the event control unit 43 notifies the activation control unit 41 thereof, accordingly. The activation control unit 41 determines that the condition for quitting displaying the sub screen image is satisfied and transmits instructions to the function control unit 44 and to the screen image managing unit 42. In this case, after the user pulls out the sub screen image by using the rear touch panel 70, the sub screen image remains to be displayed until the user makes an operation for quitting displaying the sub screen image.

A combination of the aforementioned technologies may be used. For example, in case the user has made an operation for preventing the sub screen image from being pulled in when the user pulled out the sub screen image, the sub screen image may remain to be displayed until the user makes an operation for quitting displaying the sub screen image, and in case the user has not made the operation for preventing, the displaying of the sub screen image may be terminated automatically when an input onto the rear touch panel 70 does not exist anymore. For example, the activation control unit 41 may determine that an operation for preventing the sub screen image from automatically being pulled in is made when the user first moves the portion for inputting from left to right on the rear touch panel 70 so as to pull out the sub screen image from the left side or the right side, and then moves the portion for inputting further to the top or to the bottom as if trying to fasten the pulled out sub screen image to the top or to the bottom. Further, if the sub screen image is pulled out beyond a predetermined position or a predetermined area, the sub screen image may remain to be displayed until the user makes an operation for quitting displaying the sub screen image, and if the sub screen image is pulled out but does not exceed the predetermined position or the predetermined area, displaying of the sub screen image may be automatically terminated when an input onto the rear touch panel 70 does not exist anymore.

Next, an explanation will be given on examples of the functions provided by the sub screen image. Those functions are implemented by the function control unit 44.

Figure 7A:
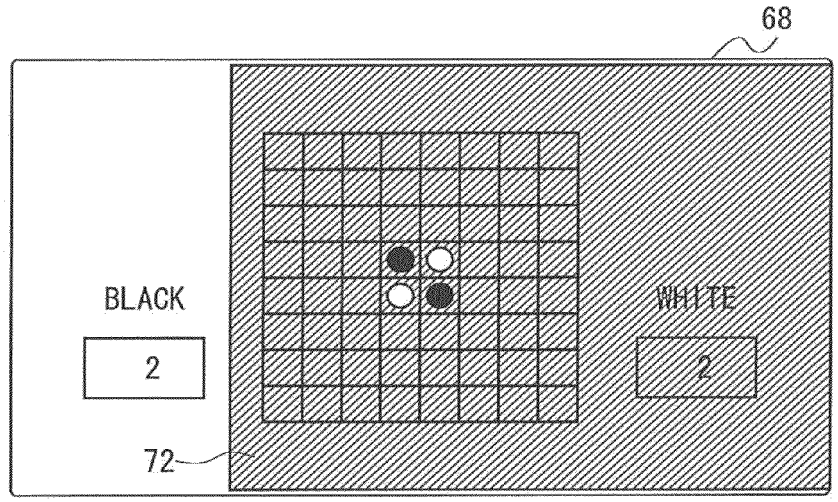
FIGS. 7A, 7B, and 7C are diagrams that illustrate a copy function.
Figure 7B:
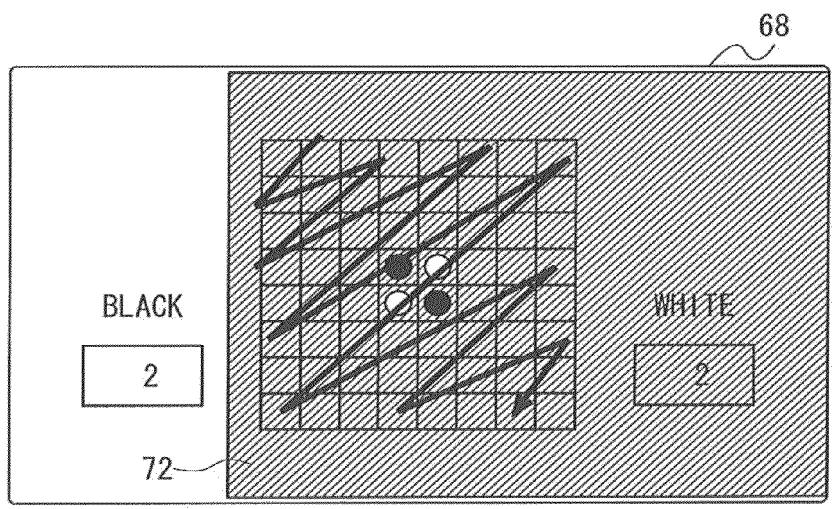
Figure 7C:
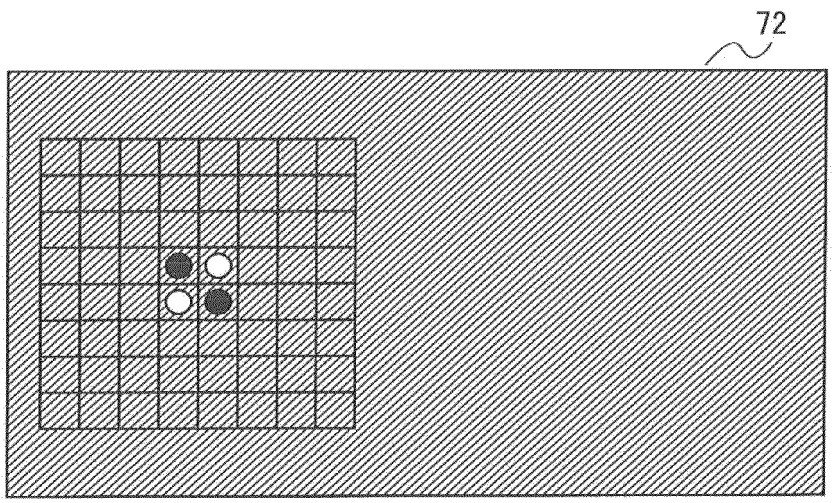

FIGS. 7A, 7B, and 7C are diagrams that illustrate a copy function. If a user makes an operation of rubbing on the sub screen image 72 as shown in FIG. 7B while the sub screen image 72 provided with the copy function is being displayed after the screen was pulled out as shown in FIG. 7A, the function control unit 44 copies to the sub screen image 72 an image displayed at the position where the user has rubbed, the image being included in image that is displayed under the sub screen image 72, as shown in FIG. 7C. A region to be copied may be defined by specifying a rectangle by a drag operation, or the like. The copied image may be stored in a clipboard, or the like, or may be stored in a predetermined storage region in a storage device provided in the game device 10.

Figure 8A:
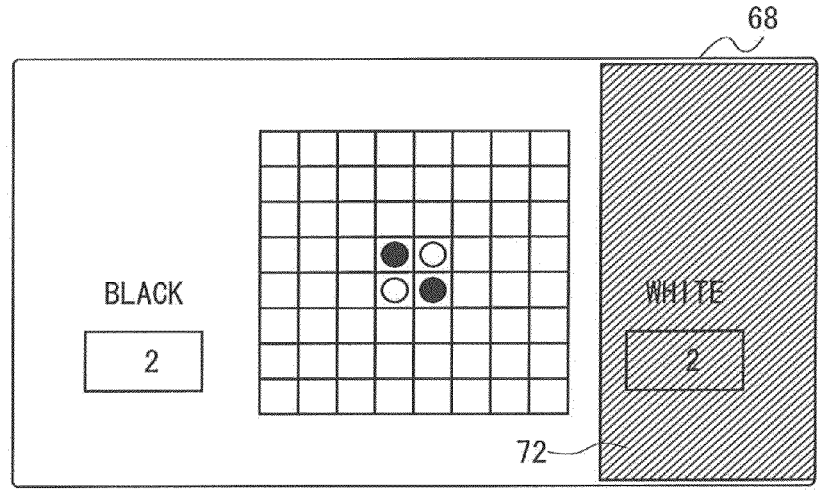
FIGS. 8A, 8B, and 8C are diagrams that illustrate a mask function.
Figure 8B:
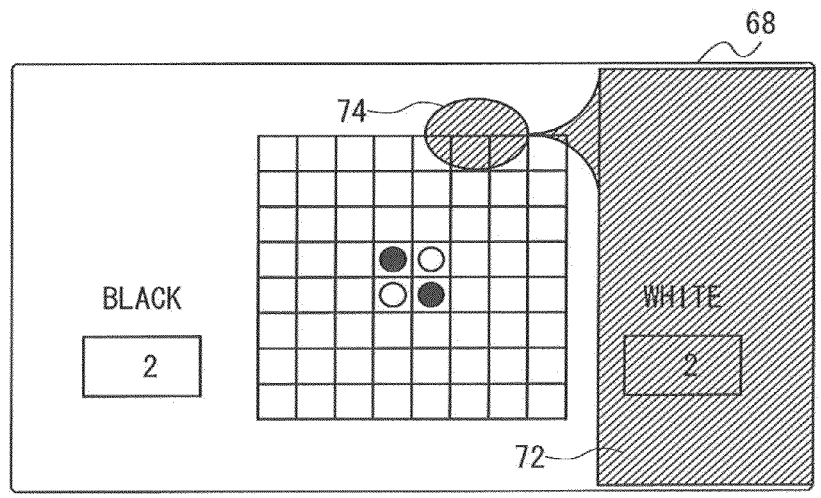
Figure 8C:
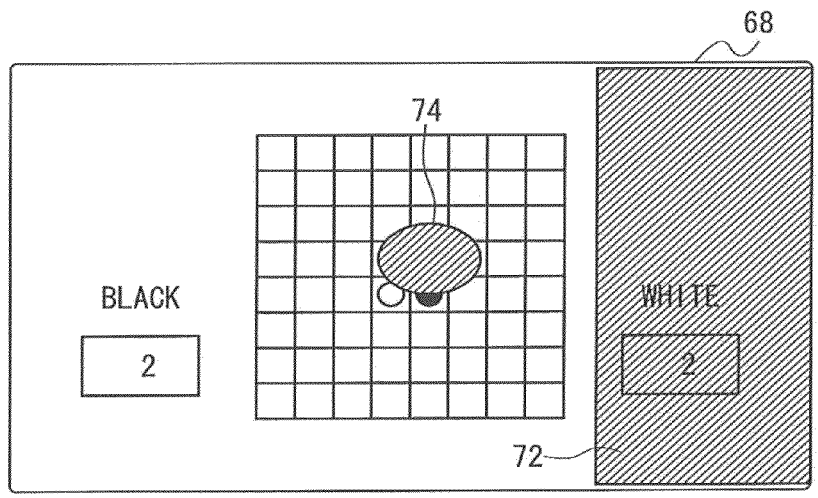

FIGS. 8A, 8B, and 8C are diagrams that illustrate a mask function. If a user drags a part of the sub screen image 72 as shown in FIG. 8B while the sub screen image 72 provided with the mask function is being displayed after the screen was pulled out as shown in FIG. 8A, the function control unit 44 displays the part of the sub screen image 72 being torn off as a mask region 74. As shown in FIG. 8C, the user can move the mask region 74 to an arbitrary position and can mask the arbitrary position. Thereby, for example when taking a screen shot, the mask region 74 can be defined as an opaque mask and a region that should not be shot can be masked, or when playing a puzzle game or the like, the mask region 74 can be defined for a region that the user would not like to touch and the mask region 74 can block input operations for the region. Further, the mask region 74 can be used for supporting user's inputs, for example, one operation input for the mask region 74 may be constantly recognized as a plurality of input operations. The function control unit 44 may provide a sub screen image 72 having a scale up function or a scale down function.

Figure 9:
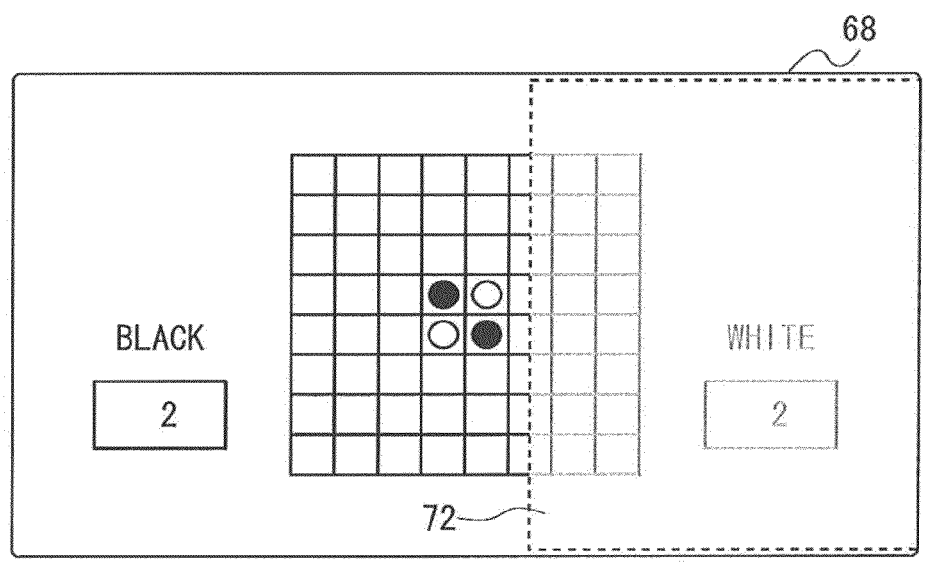
FIG. 9 is a diagram that illustrates an image filtering function.

FIG. 9 is a diagram that illustrates an image filtering function. As shown in FIG. 9, if the sub screen image 72 provided with an image filtering function is pulled out, the function control unit 44 applies a predetermined image filtering effect to a region included in an image displayed on the display device 68, the region overlaid with the sub screen image 72. An arbitrary image effect may be applied, for example, an image may be displayed in gray scale, displayed as a mosaic, displayed in sepia, etc. The function control unit 44 may readout frame data, which an application that displays an image on the display device 68 renders into VRAM or the like, may apply a predetermined image effect to the data, and may overwrite the VRAM.

Figure 10A:
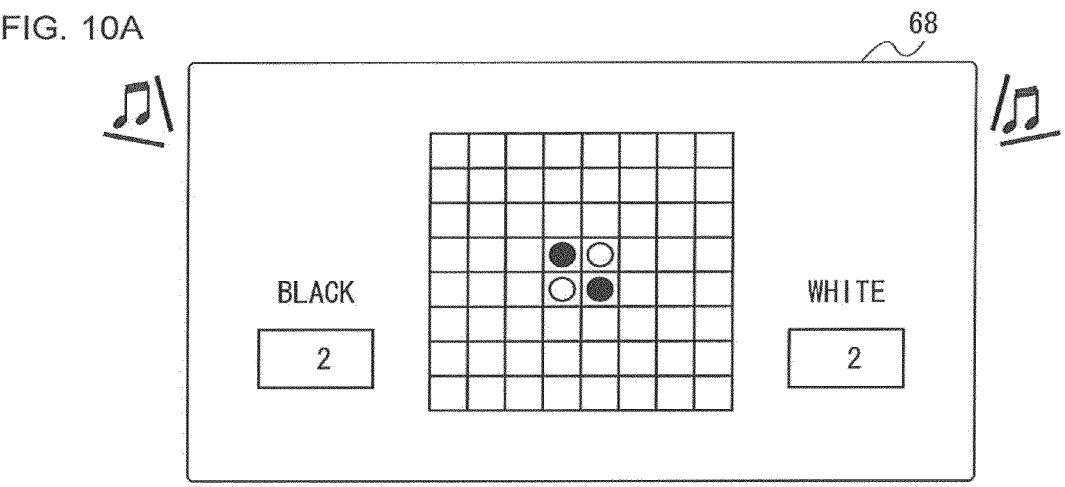
FIGS. 10A, 10B, and 10C are diagrams that illustrate a mute function.
Figure 10B:
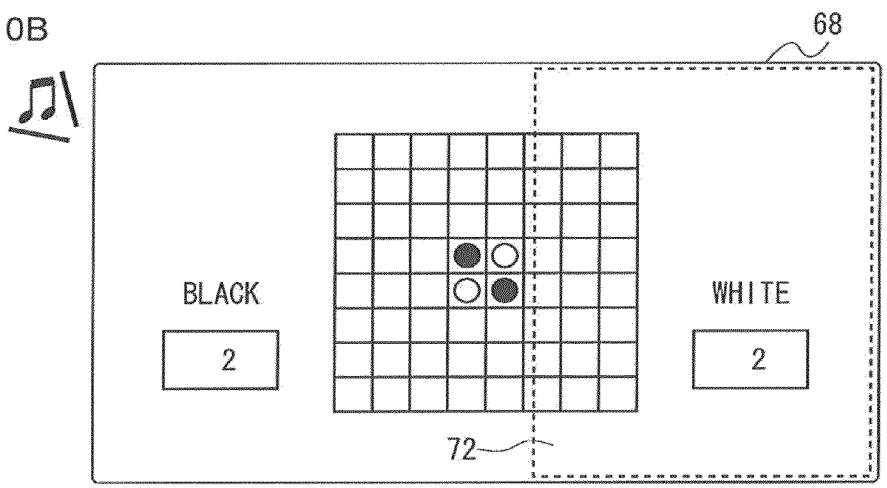
Figure 10C:
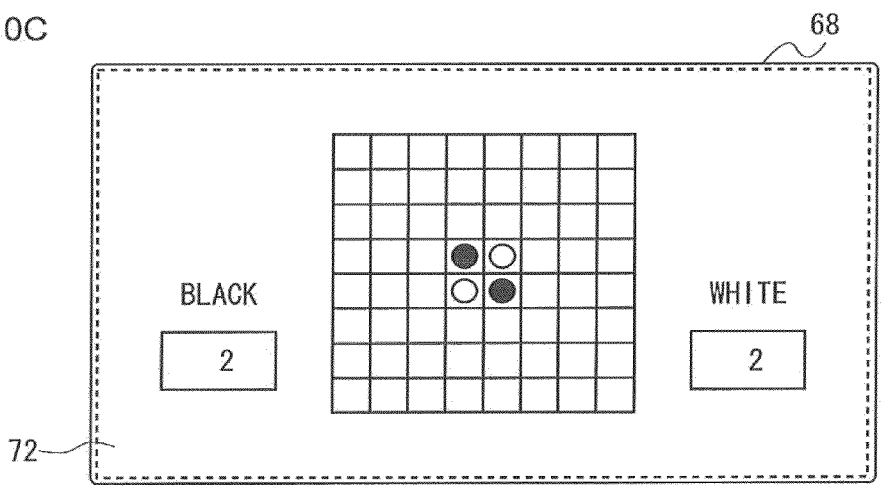

FIGS. 10A, 10B, and 10C are diagrams that illustrate a mute function. If the sub screen image 72 provided with a mute function is pulled out as shown in FIG. 10B when sounds are output from left and right speakers provided with the game device 10 as shown in FIG. 10A, the function control unit 44 mutes sounds from a speaker at the side from which the sub screen image 72 is pulled out. If the sub screen image 72 is pulled out so as to cover all over an image displayed on the display device 68, the function control unit 44 mutes the sounds from the speakers at both sides. The function control unit 44 may reduce the sound volume of the speaker in accordance with the size of the pulled-out region of the sub screen image 72, or the like. The function control unit 44 may adjust the sound volume of a second sound channel, or the sound volume of a certain track of music. Alternatively, the function control unit 44 may not adjust the sound volume but may adjust the sound effect, such as a surrounding effect, or the like. The function control unit 44 may not only adjust the sound volume while assuming the sub screen image 72 as a sound barrier, but may also allocate a sound to the sub screen image 72 and may play back the allocated sound at a volume corresponding to the size of the pulled out region of the sub screen image 72.

Figure 11:
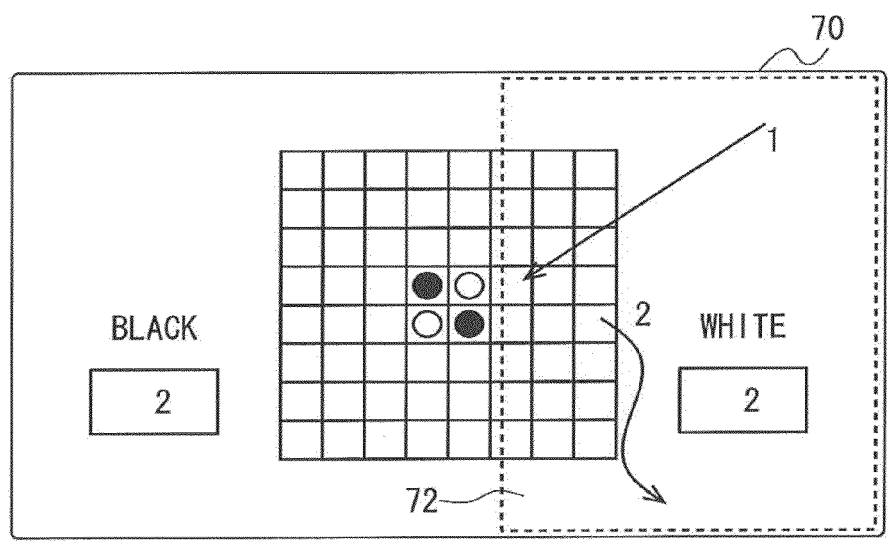
FIG. 11 is a diagram that illustrates an operation history recording function.

FIG. 11 is a diagram that illustrates an operation history recording function. If a user performs an operation on the touch panel 69, while the sub screen image 72 provided with the operation history recording function is being displayed after the screen was pulled out as shown in FIG. 11, the function control unit 44 records a history of operation performed by the user into a history storing unit (not shown). The function control unit 44 may records only the operation made on the pulled-out region of the sub screen image 72, or may record operation made at any position on the whole area of the touch panel 69. The function control unit 44 may record operation made on the rear touch panel 70. The operation history of a user stored in the history storing unit may be presented to the user in response to an instruction, or may be provided so that the user can select an operation that the user would like to perform again, the operation included in the presented operation history. In order to present the operation history to a user, for example, a tab for presenting the operation history may be provided in a clipboard function shown in FIG. 13. Further, the history storing unit may be referred to when a user instructs to cancel the operation that has been made immediately before the cancellation.

Figure 12A:
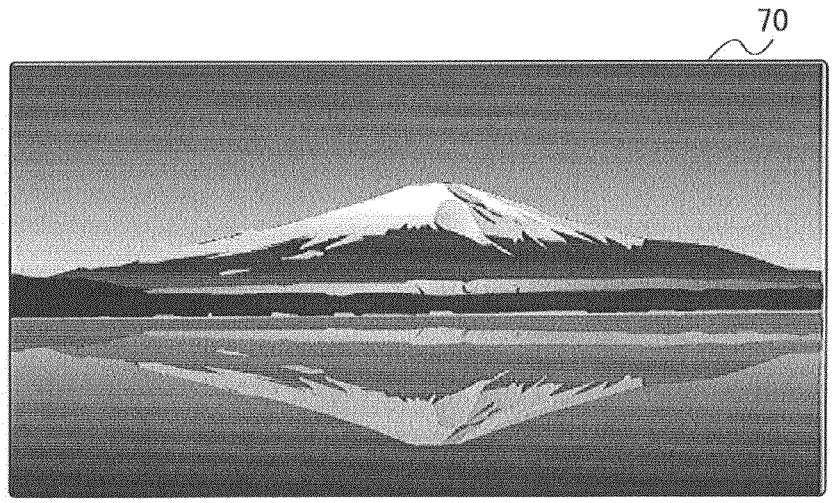
FIGS. 12A, 12B, and 12C are diagrams that illustrate an information displaying function.
Figure 12B:
Figure 12C:
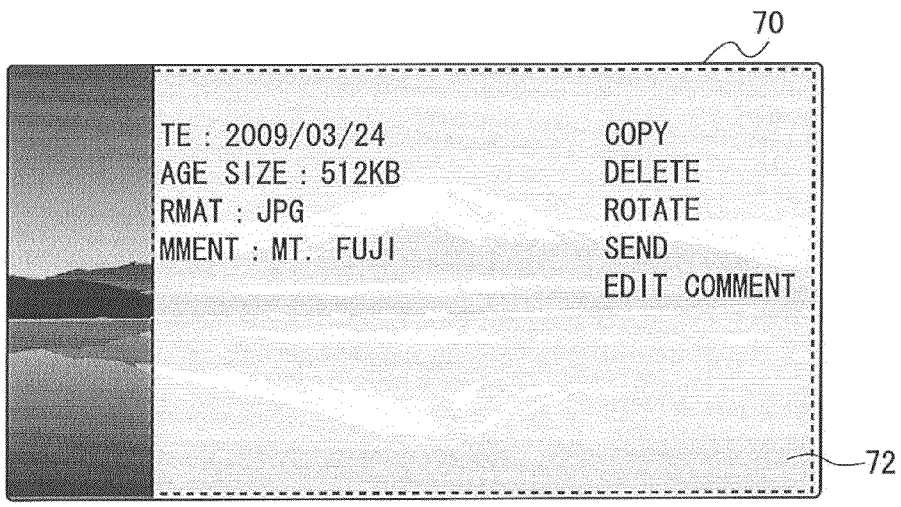

FIGS. 12A, 12B, and 12C are diagrams that illustrate an information displaying function. If the sub screen image 72 provided with an information displaying function is pulled out when an image is displayed by an application provided with an image displaying function as shown in FIG. 12A, the function control unit 44 displays information relating to the image being displayed on the sub screen image 72 as shown in FIG. 12B. As shown in FIG. 12C, only information on the region overlaid by the sub screen image 72 may be displayed. This makes information that should be displayed at a region lying off the edge of the sub screen image 72 invisible, which allows the user to readily switch the displaying of the information between visible and invisible, for example in case the user tries to learn the information by heart or tries to check his/her memory, etc. Further, the function control unit 44 may provide a context menu on the sub screen image 72.

Figure 13A:
FIGS. 13A, 13B, and 13C are diagrams that illustrate a caption displaying function.
Figure 13B:
Figure 13C:

FIGS. 13A, 13B, and 13C are diagrams that illustrate a caption displaying function. If the sub screen image 72 provided with a caption displaying function is pulled out when content (e.g., movies, programs, or the like) is displayed on the basic screen image as shown in FIG. 13A, the function control unit 44 displays a caption on the sub screen image 72, the caption allocated to a scene being displayed on the basic screen image as shown in FIG. 13B. This allows a caption to be arranged at a position of preference on the screen image. Further, a caption can be displayed only when the user would like to refer thereto. As shown in FIG. 13C, a caption in other language may be displayed on the sub screen image 72. The language to be displayed as a caption may be selected in accordance with the direction in which the sub screen image 72 is pulled out.

Figure 14A:
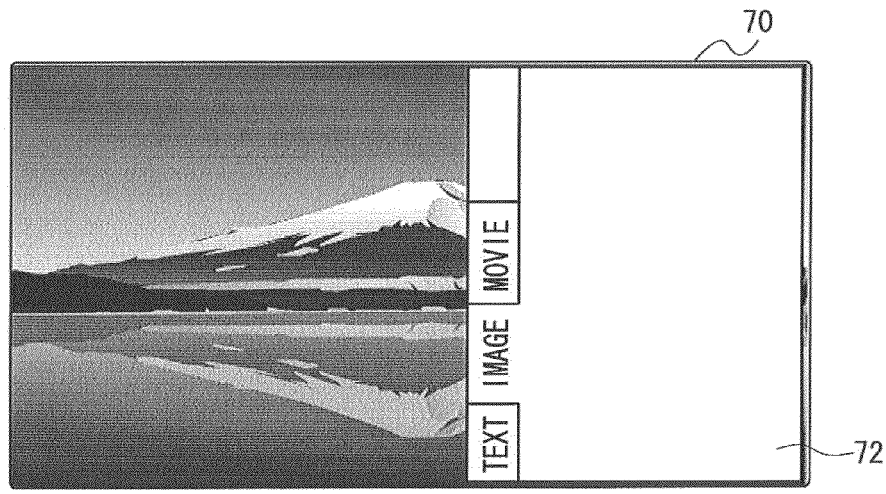
FIGS. 14A and 14B are diagrams that illustrate a clipboard function.
Figure 14B:
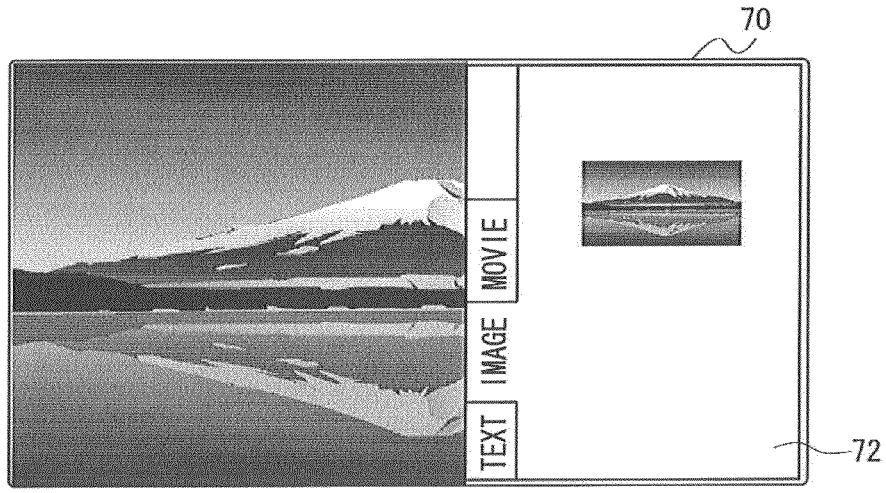

FIGS. 14A and 14B are diagrams that illustrate a clipboard function. If the sub screen image 72 provided with a clipboard function is pulled out, the function control unit 44 displays data stored in a clipboard on the sub screen image 72 while sorting the data by tabs. If the user drags and drops the data displayed on the display device 68 to the sub screen image 72, the function control unit 44 adds the dropped data to the clipboard as shown in FIG. 14B.

Figure 15A:
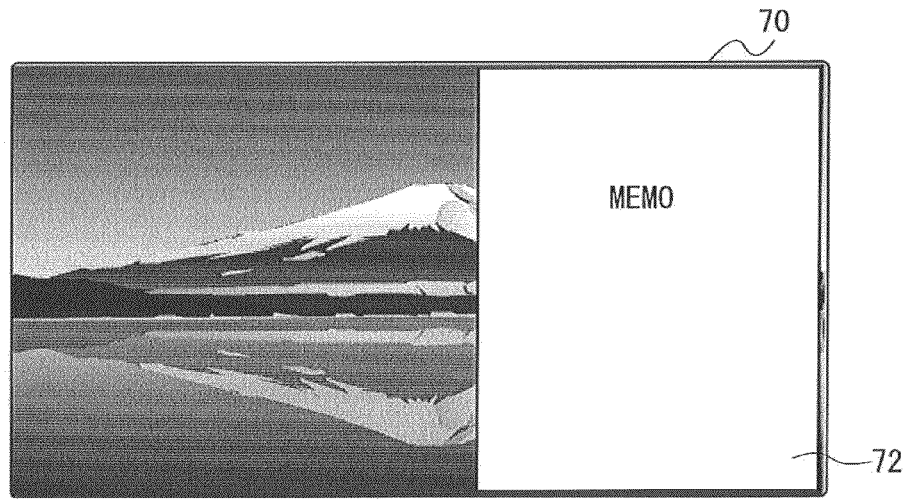
FIGS. 15A and 15B are diagrams that illustrate a memo function and a browser function.
Figure 15B:
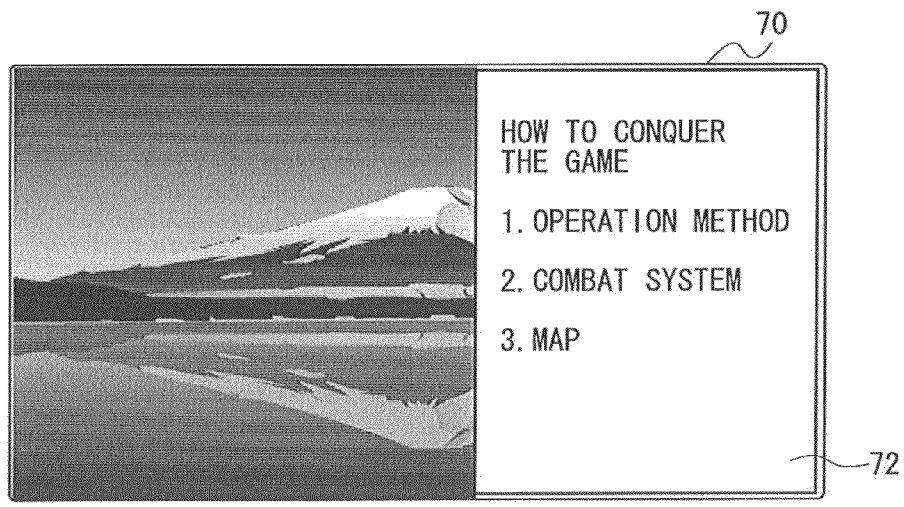

FIGS. 15A and 15B are diagrams that illustrate a memo function and a browser function. If the sub screen image 72 provided with a memo function is pulled out, the function control unit 44 allocates a region for inputting text or figures to the sub screen image 72 as shown in FIG. 15A. The function control unit 44 displays text input via a keyboard, or a figure input by handwriting using a stylus pen or the like on the sub screen image 72, and concurrently records the input contents into a storage device, or the like. This enables a user to input and record text or figures during playing a game or during playing back contents, etc, while retaining the visibility of the screen image to some extent. If the sub screen image 72 provided with a browser function is pulled out, the function control unit 44 allocates a display screen image of a browser for displaying an image stored in the storage device or the like, a web page acquired through communication, etc. as shown in FIG. 15B. This allows a user to display, while playing a game, a web page in which the information on the game is described, an image indicating a map of the game, or the like when he/she would like to view.

FIG. 16 is a diagram that illustrates a text input function. If the sub screen image 72 provided with a text input function is pulled out, the function control unit 44 displays on the sub screen image 72 a pallette 75 for inputting a character and a region 76 for displaying input text, as shown in FIG. 16. The function control unit 44 recognizes a character input to the pallette 75 by handwriting using a stylus pen or the like, and displays the character on the region 76. The function control unit 44 may display the sub screen image 72 while detecting a contact to the rear touch panel 70. If the portion having a contact is detached from the rear touch panel 70, the function control unit 44 may fix text that has been input and may delete the sub screen image 72.

FIG. 17 is a diagram that illustrates a music playback function. If the sub screen image 72 provided with a music playback function is pulled out, the function control unit 44 displays information on music being played back on the sub screen image 72 as shown in FIG. 17. The function control unit 44 keeps executing the music playback function also after the sub screen image 72 is deleted. While the sub screen image 72 is displayed after having pulled out, a part of the input device 20 may be used as a user interface for the music playback function. A detailed description on this technology will be given later.

FIG. 18 shows an example of internal data of a function control table. The function control table 60 is provided with an operation field 80, a function field 81, and a condition field 82. The operation field 80 stores the details of the operation made on the rear touch panel 70 or the like. In the example shown in FIG. 18, the direction in which to move a contact portion (e.g., a finger, or the like) after the user allows the contact portion to contact with the rear touch panel 70 is stored. In case a function to be activated is determined depending on the position or the strength of a contact, information on the position or the strength of the contact is also stored in the operation field 80. In case a function is activated in accordance with the inclination of the game device 10 as explained with FIGS. 5A, 5B, and 5C, information, such as, the direction of the inclination, or the like is stored in the operation field 80. The function field 81 stores a function to be activated in accordance with the operation made on the rear touch panel 70 or the like. The condition field 82 stores a condition for determining whether or not the function is allowed to be activated. For example, the condition field 82 may store a condition that the function is not activated if other predetermined function is running, etc.

The activation control unit 41 acquires from the input unit 30 the details of an operation made on the rear touch panel 70 or the like, refers to the function control table 60, and determines a function to be activated, accordingly. The activation control unit 41 further refers to the function control table 60, and determines whether or not the function is allowed to be activated. In case of determining to activate the function, the activation control unit 41 instructs the function control unit 44 to activate the function, and instructs the screen image managing unit 42 to display the sub screen image 72.

Figure 19A:
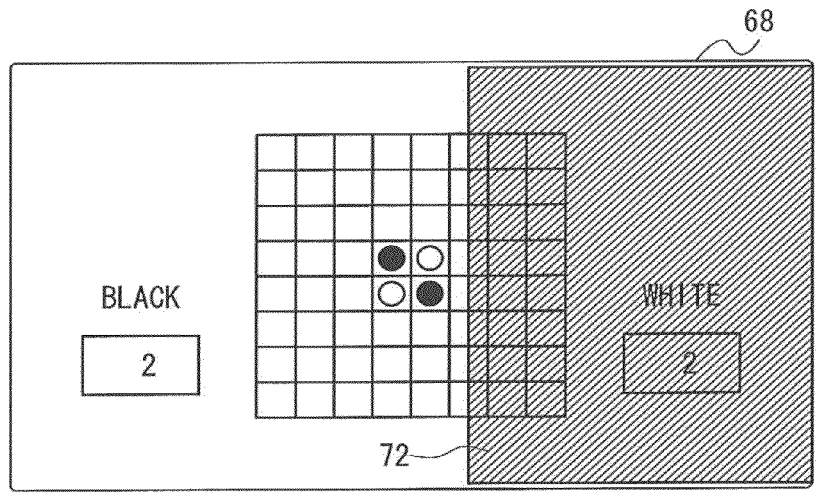
FIGS. 19A, 19B, and 19C show display modes of a sub screen image and a basic screen image when the sub screen image is displayed.
Figure 19B:
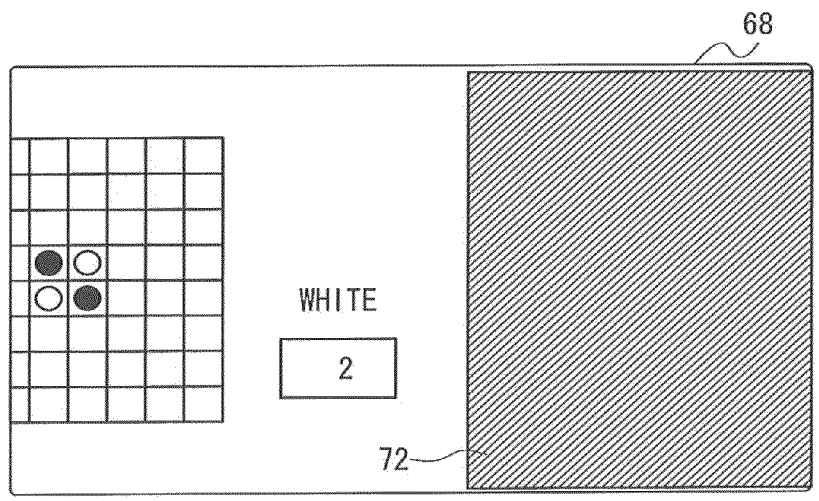
Figure 19C:
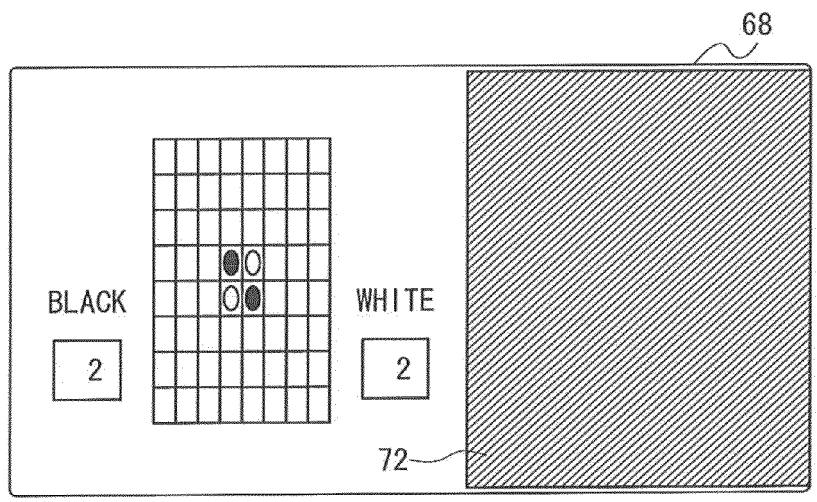

FIGS. 19A, 19B, and 19C show display modes of a sub screen image and a basic screen image when the sub screen image is displayed. In FIG. 19A, the screen image managing unit 42 displays the sub screen image 72 half translucently and so as to overlap with the basic image. In FIG. 19B, the screen image managing unit 42 displays the sub screen image 72 so as to slide out from the right edge of the screen in the left direction. In this process, the screen image managing unit 42 may display the sub screen image 72 so as to thrust out the basic image in the left direction as the sub screen image 72 is pulled out from the right. In FIG. 19C, the screen image managing unit 42 displays a basic screen image while compressing the basic screen image. In this process, in order to keep the same horizontal to vertical ratio, the image may be compressed also in the vertical direction with the same compression rate as that of the horizontal direction.

The screen image managing unit 42 may manage a frame memory for rendering the basic screen image and a frame memory for rendering the sub screen image. In the example shown in FIG. 19A, the screen image managing unit 42 synthesizes the basic screen image and the sub screen image with a predetermined alpha value and writes the synthesized image into the VRAM. In the example shown in FIG. 19B, the screen image managing unit 42 generates a screen image to be displayed from a part of the basic screen image and a part of the sub screen image, and writes the generated image into the VRAM. In the example shown in FIG. 19C, the screen image managing unit 42 writes a part of the sub screen image into the VRAM, and writes the scale-downed basic screen image in a remained region. In this manner, since the screen image managing unit 42 automatically generates a screen image to be displayed from the basic screen image and the sub screen image, the application 45 or the function control unit 44 can operate without taking a display mode into account. In case of displaying a plurality of sub screen images, the screen image managing unit 42 may reduce the resolution of respective sub screen images in accordance with the increment of the number of the sub screen images. This can suppress a required memory capacity to a low level.

Figure 20A:
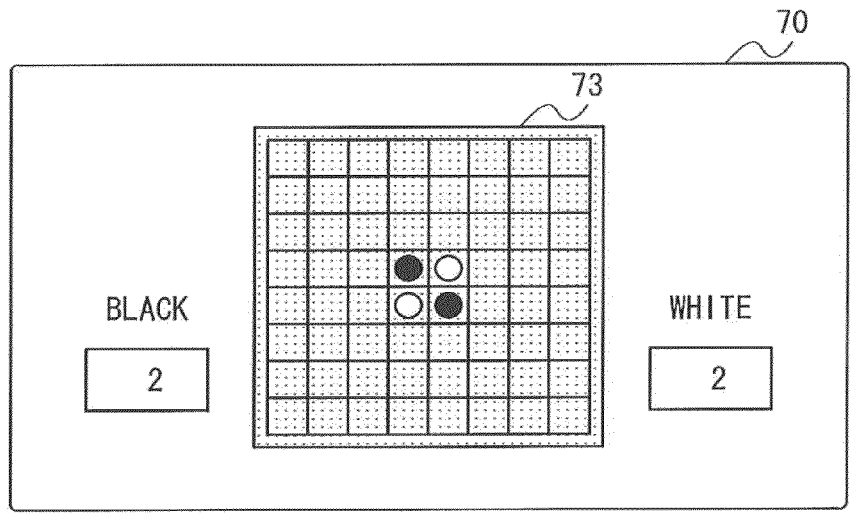
FIGS. 20A, 20B, and 20C are diagrams that illustrate a technology for restricting a region for displaying the sub screen image.
Figure 20B:
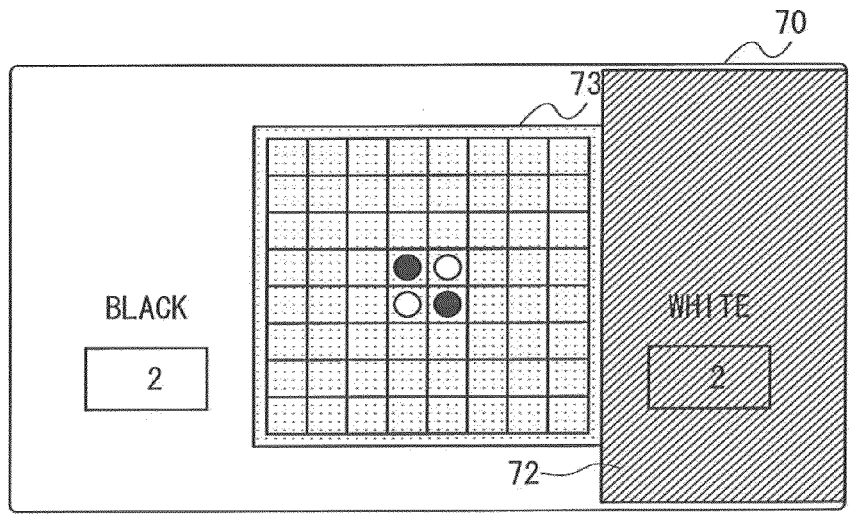
Figure 20C:
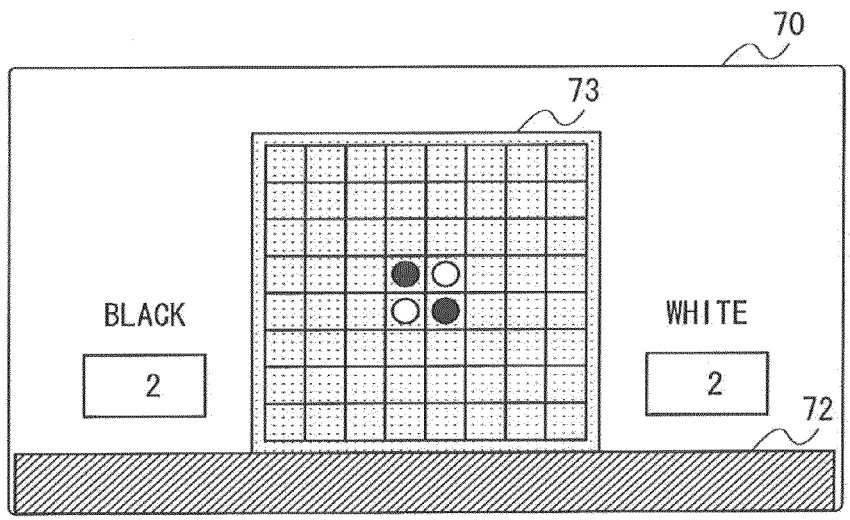

FIGS. 20A, 20B, and 20C are diagrams that illustrate a technology for restricting a region for displaying the sub screen image. As shown in FIG. 20A, the screen image managing unit 42 defines a display restriction region 73 in which the sub screen image 72 should be forbidden to be displayed. The definition of the display restriction region 73 may be received from the application 45 that displays the basic screen image, or may be received from the function control unit 44 that displays the sub screen image. In case the display restriction region 73 is defined, the screen image managing unit 42 controls the sub screen image 72 so as not to be displayed on the display restriction region 73 as shown in FIGS. 20B and 20C. The screen image managing unit 42 may restrict an area size for displaying the sub screen image.

FIG. 21 shows an example of internal data of a screen image managing table 62. The screen image managing table 62 is provided with a screen image ID field 90, a position field 91, a size field 92, a sequence field 93, a display mode field 94, an input device field 95, a touch panel field 96, and a rear touch panel field 97. When the application 45 displays a basic screen image, or when the function control unit 44 displays a sub screen image, the screen image managing unit 42 acquires information relating to the basic screen image or the sub screen image from the application 45 or the function control unit 44 and registers the information with the screen image managing table 62.

The screen image ID field 90 stores the IDs of the basic screen image and the sub screen image. In the example shown in FIG. 21, the ID of the basic screen image is defined as "00", and the IDs of the sub screen images are defined as "01", "02", . . . . The position field 91 stores the position of the screen image. In the example shown in FIG. 21, the position field 91 stores the left top position of the screen image in the coordinates on the display device 68. The size field 92 stores the size of the screen image. The sequence field 93 stores the current sequence of displaying of the screen images. In the example shown in FIG. 21, the basic screen image "00" is displayed under the sub screen image "01", and the sub screen image "02" is not displayed currently. As shown in FIGS. 19B and 19C, in case the basic screen image and the sub screen image are displayed so as not to overlap with each other, the sequence of displaying may be defined so that the both screen images are in a same position in the sequence, or may be defined so that a screen image currently being active is displayed over the other screen image.

The display mode field 94 stores the display mode of the screen images. As the display mode of the basic screen image, information indicating which of the display modes shown in FIG. 19A, 19B, or 19C is adopted when the sub screen image is displayed may be stored. In case of providing a display restriction region, information such as, the position and the size of the display restriction region, or the like may be stored. The information indicating which of the display modes shown in FIG. 19A, 19B, or 19C is adopted may be stored as the display mode of the sub screen image, alternatively. Information indicating, in case that the display mode of the basic screen image and the display mode of the sub screen image conflict with each other, which of the display modes is prioritized may be further stored. The activation control unit 41 may forbid the activation of a function with which a display mode of the sub screen image that conflicts with the display mode of the basic screen image is defined.

The input device field 95 stores information indicating whether or not to receive information input via the input device 20 when the screen image is displayed at the top level, or when the screen is active. In case that a function provided by the sub screen image does not require an operation input via the input device 20 as in the example of the mute function shown in FIGS. 10A, 10B, and 10C, information indicating that an operation input from the input device 20 is not received is stored in the input device field 95. In case that a function provided by the sub screen image should be operated after receiving an operation input via the input device 20 as in the example of the music playback function shown in FIG. 17, information indicating that an operation input from the input device 20 is preferentially received is stored in the input device field 95. In this case, if the sub screen image is pulled out, the event control unit 43 first waits until the status is changes to a neutral status in which all the buttons and keys included in the input device 20 are not manipulated, and then moves the notification destination of an operation input from the input device 20 to the function control unit 44 that controls the sub screen image. In case that no operation is input to the sub screen image via the input device 20 for a certain period of time, the screen image managing unit 42 may delete the sub screen image automatically. In this case, the event control unit 43 moves the notification destination of an operation input from the input device 20 back to the application 45. While the notification destination of an operation input from the input device 20 is shifted to and retained by the function control unit 44 that controls the sub screen image, in order to indicate the shift to the user, the screen image managing unit 42 may change the display mode, for example by coloring the surrounding area of the sub screen image, or muting the manipulation sound of the input device 20, etc. In the input device field 95 of the basic screen image, information may be stored, the information indicating that even if the sub screen image is displayed at the top level, the application 45 that displays the basic screen image receives information input via the input device 20. In this case, additional information may be further stored, the additional information indicating which of the application 45 that displays the basic image and the function control unit 44 that displays the sub screen image should be prioritized when a sub screen image that is defined so as to receive an operation input via the input device 20 is displayed. The activation control unit 41 may forbid the activation of a function that is defined so as to receive an operation input via the input device 20. The input device field 95 may store information indicating whether or not an input operation should be received for each button or direction key included in the input device 20.

The touch panel field 96 stores information indicating whether or not to receive information input via the touch panel 69 when the screen image is displayed at the top level, or the screen image is set as active. In case that a function provided by the sub screen image does not require an operation input via the touch panel 69 as in the example of the mute function shown in FIGS. 10A, 10B, and 10C, information indicating that an operation input from the touch panel 69 is not received is stored in the touch panel field 96. In case that a function provided by the sub screen image should be operated after receiving an operation input via the touch panel 69 as in the example of the text input function shown in FIG. 16, information indicating that an operation input from the touch panel 69 is preferentially received is stored in the touch panel field 96. In case that both of the function provided by the sub screen image and the application 45 should receive an operation input via the touch panel 69 as in the example of the operation history recording function shown in FIG. 11, information indicating that is stored in the touch panel field 96. In case that the application 45 should be notified that an operation input from the touch panel 69 through the sub screen image is received, information indicating that is stored in the touch panel field 96. In this case, for instance, in the example shown in FIG. 11, if the sub screen image 72 receives an operation input at a region where the sub screen image 72 overlaps with the basic screen image, the application 45 is notified that the operation is input through the sub screen image, and if an input operation is received at a region where the sub screen image 72 does not overlap with the basic screen image, the application 45 is merely notified that the operation is input.

The rear touch panel field 97 stores information indicating whether or not to receive information input via the rear touch panel 70 when the screen image is displayed at the top level, or the screen image is set as active. In case that a function provided by the sub screen image does not require an operation input via the rear touch panel 70, information indicating that an operation input from the rear touch panel 70 is not received is stored in the rear touch panel field 97. In case that a function provided by the sub screen image should be operated after receiving an operation input via the rear touch panel 70, information indicating that an operation input from the rear touch panel 70 is preferentially received is stored in the rear touch panel field 97.

When acquiring an operation input from the input device 20, the touch panel 69, or the rear touch panel 70 through the input unit 30, the event control unit 43 refers to the screen image managing table 62, determines a target of notification of the input operation, and notifies the determined target of the input operation, accordingly.

The screen image managing table 62 may further store information indicating how to respond to an input operation in case the sub screen image is pulled out while a portion for inputting has a contact with the touch panel 69. For instance, in the example shown in FIG. 19B, if the sub screen image 72 is pulled out while a portion for inputting has a contact with the basic screen image, the basic screen image is also slid. As a result, the position of the portion for inputting moves on the basic screen image. Also in the example shown in FIG. 19C, if the sub screen image 72 is pulled out while a portion for inputting has a contact with the basic screen image, the basic screen image is scaled down. As a result, the position of the portion for inputting moves on the basic screen image. The screen image managing table 62 may store information indicating whether to: a) interpret the contact as invalid and interpret that the portion for inputting is detached from the touch panel 69; b) interpret that a drag operation is made with the portion for inputting; c) neglect the movement of the portion for inputting on the basic screen image and interpret that the portion for inputting keeps the contact at the original contact position; or d) prohibit the sub screen image from sliding while the portion for inputting has a contact with the touch panel 69, in the aforementioned cases.

Also in the example shown in FIG. 19A, if the sub screen image 72 is pulled out while a portion for inputting has a contact with the basic screen image, and if the sub screen image 72 is pulled out to the contact position, the contact status changes from a direct contact with the basic screen image to a contact with the basic screen image through the sub screen image. If the sub screen image is defined not to receive an operation input via the touch panel 69, the screen image managing unit 42 allows the sub screen image to overlap at the position of the contact portion, since the status is not changed even if the sub screen image is overlapped. If the sub screen image is defined to receive an operation input via the touch panel 69 preferentially, the screen image managing unit 42 may set the sub screen image so as to be pulled out only to the position of the contact portion in the maximum in order to avoid the sub screen image from being displayed while overlapping at the position of the contact portion. In case of pulling out the sub screen image further, the event control unit 43 may notify the application 45 that the portion for inputting is detached from the basic screen image, and may notify the function control unit 44 that the portion for inputting have a contact with the sub screen image and the portion for inputting is moving concurrently with the sliding of the sub screen image.

While the portion for inputting has a contact with a sub screen image that is defined so as to receive an operation input via the touch panel 69, the screen image managing unit 42 may forbid the sub screen image to slide. In case of sliding the sub screen image, the contact may be interpreted as invalid and may be interpreted that the portion for inputting is detached from the touch panel, or may be interpreted that a drag operation is made with the portion for inputting. Alternatively, the movement of the portion for inputting on the sub screen image may be neglected and may be interpreted that the portion for inputting keeps the contact at the original contact position.

Given above is an explanation based on the exemplary embodiments. These embodiments are intended to be illustrative only and it will be obvious to those skilled in the art that various modifications to constituting elements and processes could be developed and that such modifications are also within the scope of the present invention.

DESCRIPTION OF THE REFERENCE NUMERALS

10 game device, 30 input unit, 40 control unit, 41 activation control unit, 42 screen image managing unit, 43 event control unit, 44 function control unit, 45 application, 60 function control table, 62 screen image managing table, 68 display device, 70 rear touch panel.

The present invention is applicable to a game device provided with a touch panel, a game control program, and a method for controlling a game.

The invention claimed is:
1. A game device comprising:
a display configured to display a basic screen image and a virtual screen image, wherein the virtual screen image at least partially overlays the basic screen image when the virtual screen image is activated;
a front touch panel provided in association with the display and configured to receive front touch input from a user;
a rear touch panel provided on an opposite side of the game device from the display and configured to receive rear touch input from the user;
an application operative to provide a predetermined function;
a function control unit operative to control a function that is activated when the rear touch panel is operated, including activating the virtual screen image on the display device when the rear touch panel is operated by the user;
an input device operative to allow the user to input instructions to the application via the front touch input from the front touch panel and to allow the user to input instructions to the function control unit via the rear touch input from the rear touch panel, such that a user may provide the front touch input to the basic screen image via the front touch panel: (i) without providing the front touch input through the virtual screen image when the front touch input is made in a region of the front touch panel corresponding to where the virtual screen image does not overlap the basic screen image on the display, and (ii) by providing the front touch input through the virtual screen image when the front touch input is made in a region of the front touch panel corresponding to where the virtual screen image overlaps the basic screen image on the display; and
an event control unit operative, when the basic screen image displayed in accordance with the application and the virtual screen image displayed in accordance with the function control unit are displayed on the display device, to determine to which of the application or the function control unit to notify of the front touch input or rear touch input, and operative to notify a determined target of the front touch input or the rear touch input,
wherein the event control unit notifies the application that the front touch input is made to the basic screen image through the virtual screen image when the front touch input is received in the region corresponding to where the virtual screen image and the basic screen image overlap on the display.

2. A game device, comprising:
a display configured to display a basic screen image and a virtual screen image, wherein the virtual screen image at least partially overlays the basic screen image when the virtual screen image is activated;
a front touch panel provided in association with the display and configured to receive front touch input from a user;
a rear touch panel provided on an opposite side of the game device from the display and configured to receive rear touch input from the user;
an application operative to provide a predetermined function;
a function control unit operative to control a function that is activated when the rear touch panel is operated, including activating the virtual screen image on the display device when the rear touch panel is operated by the user;
an input device operative to allow the user to input instructions to the application via the front touch input from the front touch panel and to allow the user to input instructions to the function control unit via the rear touch input from the rear touch panel;
an event control unit operative, when the basic screen image displayed in accordance with the application and the virtual screen image displayed in accordance with the function control unit are displayed on the display device, to determine to which of the application or the function control unit to notify of the front touch input or rear touch input, and operative to notify a determined target of the front touch input or the rear touch input; and a screen image managing unit configured to: (i) determine whether the front touch input from the front touch panel is provided at a position corresponding to an area of the basic screen on the display; (ii) allow the virtual screen image to be displayed overlying the basic screen on the display irrespective of whether or not the virtual screen image overlaps with the position corresponding to the front touch input, when the virtual screen image is set not to receive rear touch input; and (iii) allow the virtual screen image to be displayed overlying the basic screen on the display only to an extent that the virtual screen image does not overlap with the position corresponding to the front touch input, if the virtual screen image is set to receive rear touch input.

3. A method for controlling a game comprising:

displaying, by an application providing a predetermined function, a basic screen image on a display device, where a front touch panel is provided in association with the display and configured to receive front touch input from a user;

displaying a virtual screen image on the display device by a function control unit that controls a function activated when a rear touch panel, which is provided on an opposite side of the game device from the display and configured to receive rear touch input from the user, is operated, wherein the virtual screen image at least partially overlays the basic screen image when the virtual screen image is activated;

receiving input instructions from the user to the application via the front touch input from the front touch panel and to allow the user to input instructions to the function control unit via the rear touch input from the rear touch panel, such that a user may provide the front touch input to the basic screen image via the front touch panel: (i) without providing the front touch input through the virtual screen image when the front touch input is made in a region of the front touch panel corresponding to where the virtual screen image does not overlap the basic screen image on the display, and (ii) by providing the front touch input through the virtual screen image when the front touch input is made in a region of the front touch panel corresponding to where the virtual screen image overlaps the basic screen image on the display;

determining, when the basic screen image and the virtual screen image are displayed on the display device, to which of the application or the function control unit to notify of the front touch input or the rear touch input;

notifying a determined target of the front touch input or the rear touch input; and notifying the application that the front touch input is made to the basic screen image through the virtual screen image when the front touch input is received in the region corresponding to where the virtual screen image and the basic screen image overlap on the display device.

4. A non-transitory computer-readable recording medium containing a computer program, the computer program comprising:

a module configured to allow an application that provides a predetermined function to display a basic screen image on a display device, where a front touch panel is provided in association with the display and configured to receive front touch input from a user;

a module configured to allow a function control unit to display a virtual screen image on the display device, the function control unit controlling a function activated when a rear touch panel, which is provided on an opposite side of the game device from the display and configured to receive rear touch input from the user, is operated, wherein the virtual screen image at least partially overlays the basic screen image when the virtual screen image is activated;

a module configured to receive input instructions from the user to the application via the front touch input from the front touch panel and to allow the user to input instructions to the function control unit via the rear touch input from the rear touch panel, such that a user may provide the front touch input to the basic screen image via the front touch panel: (i) without providing the front touch input through the virtual screen image when the front touch input is made in a region of the front touch panel corresponding to where the virtual screen image does not overlap the basic screen image on the display, and (ii) by providing the front touch input through the virtual screen image when the front touch input is made in a region of the front touch panel corresponding to where the virtual screen image overlaps the basic screen image on the display;

a module configured to determine, when the basic screen image and the virtual screen image are displayed on the display device, to which of the application or the function control unit to notify of the front touch input or the rear touch input;

a module configured to notify a determined target of the front touch input or the rear touch input; and a module configured to notify the application that the front touch input is made to the basic screen image through the virtual screen image when the front touch input is received in the region corresponding to where the virtual screen image and the basic screen image overlap on the display device.

5. A method for controlling a game comprising:

displaying, by an application providing a predetermined function, a basic screen image on a display device, where a front touch panel is provided in association with the display and configured to receive front touch input from a user;

displaying a virtual screen image on the display device by a function control unit that controls a function activated when a rear touch panel, which is provided on an opposite side of the game device from the display and configured to receive rear touch input from the user, is operated, wherein the virtual screen image at least partially overlays the basic screen image when the virtual screen image is activated;

receiving input instructions from the user to the application via the front touch input from the front touch panel and to allow the user to input instructions to the function control unit via the rear touch input from the rear touch panel;

determining, when the basic screen image and the virtual screen image are displayed on the display device, to which of the application or the function control unit to notify of the front touch input or the rear touch input;

notifying a determined target of the front touch input or the rear touch input; and determine whether the front touch input from the front touch panel is provided at a position corresponding to an area of the basic screen on the display;

allowing the virtual screen image to be displayed overlying the basic screen on the display irrespective of whether or not the virtual screen image overlaps with the position corresponding to the touch input, if the virtual screen image is set not to receive rear touch input; and allowing the virtual screen image to be displayed overlying the basic screen on the display only to an extent that the virtual screen image does not overlap with the position corresponding to the front touch input, if the virtual screen image is set to receive rear touch input.

6. A non-transitory computer-readable recording medium containing a computer program, the computer program comprising:

a module configured to allow an application that provides a predetermined function to display a basic screen image on a display device, where a front touch panel is provided in association with the display and configured to receive front touch input from a user;

a module configured to allow a function control unit to display a virtual screen image on the display device, the function control unit controlling a function activated when a rear touch panel, which is provided on an opposite side of the game device from the display and configured to receive rear touch input from the user, is operated, is operated, wherein the virtual screen image at least partially overlays the basic screen image when the virtual screen image is activated;

a module configured to receive input instructions from the user to the application via the front touch input from the front touch panel and to allow the user to input instructions to the function control unit via the rear touch input from the rear touch panel;

a module configured determine, when the basic screen image and the virtual screen image are displayed on the display device, to which of the application or the function control unit to notify of the front touch input or the rear touch input;

a module configured to notify a determined target of the front touch input or the rear touch input; and a module configured to: (i) determine whether the front touch input from the front touch panel is provided at a position corresponding to an area of the basic screen on the display, (ii) allow the virtual screen image to be displayed overlying the basic screen on the display irrespective of whether or not the virtual screen image overlaps with the position corresponding to the touch input, if the virtual screen image is set not to receive rear touch input, and (iii) allow the virtual screen image to be displayed overlying the basic screen on the display only to an extent that the virtual screen image does not overlap with the position corresponding to the front touch input, if the virtual screen image is set to receive rear touch input.

\* \* \* \* \*